US009733788B2

(12) United States Patent
Ostergren et al.

(10) Patent No.: US 9,733,788 B2
(45) Date of Patent: Aug. 15, 2017

(54) MULTI-STAGE CURSOR CONTROL

(71) Applicant: Microsoft Technology Licensing, LLC, Redmond, WA (US)

(72) Inventors: Brian Ostergren, Redmond, WA (US); Jordan Dale Andersen, Kirkland, WA (US); Raman K. Sarin, Redmond, WA (US); Arnab Choudhury, Kirkland, WA (US); Rodger W. Benson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/216,883

(22) Filed: Mar. 17, 2014

(65) Prior Publication Data

US 2015/0261408 A1 Sep. 17, 2015

(51) Int. Cl.
*G09G 5/00* (2006.01)
*G06F 3/0481* (2013.01)
*G06F 3/0338* (2013.01)
*G06F 3/033* (2013.01)

(52) U.S. Cl.
CPC ........ *G06F 3/04812* (2013.01); *G06F 3/0338* (2013.01); *G06F 3/033* (2013.01)

(58) Field of Classification Search
CPC .... G06F 3/038; G06F 3/0481; G06F 3/04812; G06F 3/04842; G06F 3/03; G06F 3/033; G06F 3/0338
USPC .................. 345/156, 157; 715/856–858, 860
See application file for complete search history.

(56) References Cited

U.S. PATENT DOCUMENTS

| | | | | |
|---|---|---|---|---|
| 4,386,346 A | * | 5/1983 | Levine | G09G 5/08 345/157 |
| 5,191,641 A | * | 3/1993 | Yamamoto et al. | 345/418 |
| 5,508,717 A | * | 4/1996 | Miller | G06F 3/038 345/157 |
| 5,570,111 A | * | 10/1996 | Barrett | G06F 3/0383 345/157 |
| 5,596,347 A | * | 1/1997 | Robertson et al. | 715/856 |

(Continued)

FOREIGN PATENT DOCUMENTS

EP 1094383 4/2001

OTHER PUBLICATIONS

"International Search Report and Written Opinion", Application No. PCT/US2015/020049, Jul. 2, 2015, 14 Pages.

(Continued)

*Primary Examiner* — Jason Mandeville

(57) ABSTRACT

Multi-stage cursor control techniques are described herein in which a control algorithm having multiple stages is applied to facilitate fine grained control over cursor movement and positioning. In one or more implementations, monitoring is performed to detect input provided via a controller for a computing device to manipulate a cursor within a user interface for an application. When input is detected, a multi-stage damping algorithm is applied to the detected input. The multi-stage damping algorithm may include both spatial and temporal dampening factors. Movement of the cursor is rendered in accordance with the damped input determined via application of the algorithm. Then, when input to manipulate the cursor is concluded, an attraction sequence is initiated to move the cursor to a target element contained in the user interface.

20 Claims, 9 Drawing Sheets

(56) References Cited

U.S. PATENT DOCUMENTS

| | | | |
|---|---|---|---|
| 5,764,219 A * | 6/1998 | Rutledge | G06F 3/038 345/159 |
| 5,805,165 A * | 9/1998 | Thorne et al. | 715/823 |
| 6,031,531 A * | 2/2000 | Kimble | 715/862 |
| 6,252,579 B1 | 6/2001 | Rosenberg et al. | |
| 6,266,043 B1 | 7/2001 | Robin | |
| 6,307,536 B1 * | 10/2001 | Hada | B62D 6/002 345/157 |
| 6,693,653 B1 | 2/2004 | Pauly | |
| 7,274,355 B2 * | 9/2007 | Betts-LaCroix | G06F 3/0416 345/157 |
| 7,463,240 B2 | 12/2008 | Matsumoto et al. | |
| 8,133,119 B2 | 3/2012 | Finocchio | |
| 8,373,655 B2 * | 2/2013 | Miller | G06F 3/016 345/157 |
| 8,793,620 B2 * | 7/2014 | Stafford | G06F 3/012 345/159 |
| 2001/0045936 A1 | 11/2001 | Razzaghi et al. | |
| 2007/0139375 A1 | 6/2007 | Rosenberg et al. | |
| 2010/0115550 A1 | 5/2010 | Minnick et al. | |
| 2012/0272179 A1 * | 10/2012 | Stafford | G06F 3/012 715/781 |

OTHER PUBLICATIONS

"Second Written Opinion", Application No. PCT/US2015/020049, Mar. 7, 2016, 8 pages.
"International Preliminary Report on Patentability", Application No. PCT/US2015/020049, Jun. 28, 2016, 9 pages.

\* cited by examiner

MULTI-STAGE CURSOR CONTROL

BACKGROUND

Interaction of users with different kinds of computing devices is ever increasing. One example of this involves the proliferation of applications that may be configured in a variety of different ways to support different functionality, e.g., from word processing and spreadsheets to web browsers, games, and so forth. Users may expect applications they use to be available across different devices the users may have and may additionally expect similar experiences across those devices. For example, a developer may choose to make a web browser or version of the browser available for a desktop device, a tablet device, and a game console to accommodate user expectations for a common browsing experience.

Because of the different functionality and capabilities supported by the variety of different devices available, though, it may be difficult to maintain a common experience across devices. Interaction scenarios with a particular web browser, for instance, may vary on different devices in part because different input modalities are available for the different devices. A traditional browsing experience with a desktop computer involves using a mouse for browser navigation, which enables considerable control to select links, position the cursor and so forth. In other settings that use different input modalities, though, it may be difficult to attain comparable cursor control. For example, while controllers for a game console are well suited for game play, using a controller to manipulate a cursor can be quite challenging because translating analog controller input signals into granular "mouse-like" move commands is not trivial. Likewise, touch-based navigation of an application user interface on a tablet and mobile devices may be associated with similar challenges. Thus, there may be a gap between expectations of users for cross device experiences with browsers and other applications, and actual experiences that have traditionally been made available.

SUMMARY

Multi-stage cursor control techniques are described herein in which a control algorithm having multiple stages is applied to facilitate fine grained control over cursor movement and positioning. In one or more implementations, monitoring is performed to detect input provided via a controller for a computing device to manipulate a cursor within a user interface for an application. When input is detected, a multi-stage damping algorithm is applied to the detected input. The multi-stage damping algorithm may include both spatial and temporal dampening factors. Movement of the cursor is rendered in accordance with the damped input determined via application of the algorithm. Then, when input to manipulate the cursor is concluded, an attraction sequence is initiated to move the cursor to a target element contained in the user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Because of the different functionality and capabilities supported by different available devices, it may be difficult to provide a common experience to a user on different devices, even for the same or similar applications. Interaction scenarios with a particular web browser, for instance, may vary in part because of different input modalities for different devices. For example, while controllers for a game console are well suited for game play, using a game controller to manipulate a cursor can be quite challenging because translating analog controller input signals into granular "mouse-like" move commands is not trivial. Thus, browsing experiences traditionally available on game consoles may suffer due to limitations of game controllers used for these experiences.

Multi-stage cursor control techniques are described herein in which a control algorithm having multiple stages is applied to facilitate fine grained control over cursor movement and positioning. In one or more implementations, monitoring is performed to detect input provided via a controller for a computing device to manipulate a cursor within a user interface for an application. When input is detected, a multi-stage damping algorithm is applied to the detected input. Movement of the cursor is rendered in accordance with the damped input determined via application of the algorithm. Then, when input to manipulate the cursor is concluded, an attraction sequence is initiated to move the cursor to a target element contained in the user interface.

In one or more implementations, the control algorithm provides non-linear input damping. In addition or alternatively, the control algorithm may combine spatial and temporal damping factors for the input damping. The control algorithm may implement the automatic cursor attraction to user interface elements in the vicinity of the cursor (e.g., when input concludes), which relieves users from having to precisely position the cursor to select elements such as links, images, controls, etc. The multi-stage algorithm also enables flick and attract gestures to facilitate navigation between densely arranged elements (e.g., links on a web page) by short duration flicks. The result is an experience that gives the users fine grained control of the cursor, making it easier and more efficient to navigate between elements of an application user interface.

In the following discussion, an example environment is first described that is operable to employ the described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Operating Environment

Figure 1:
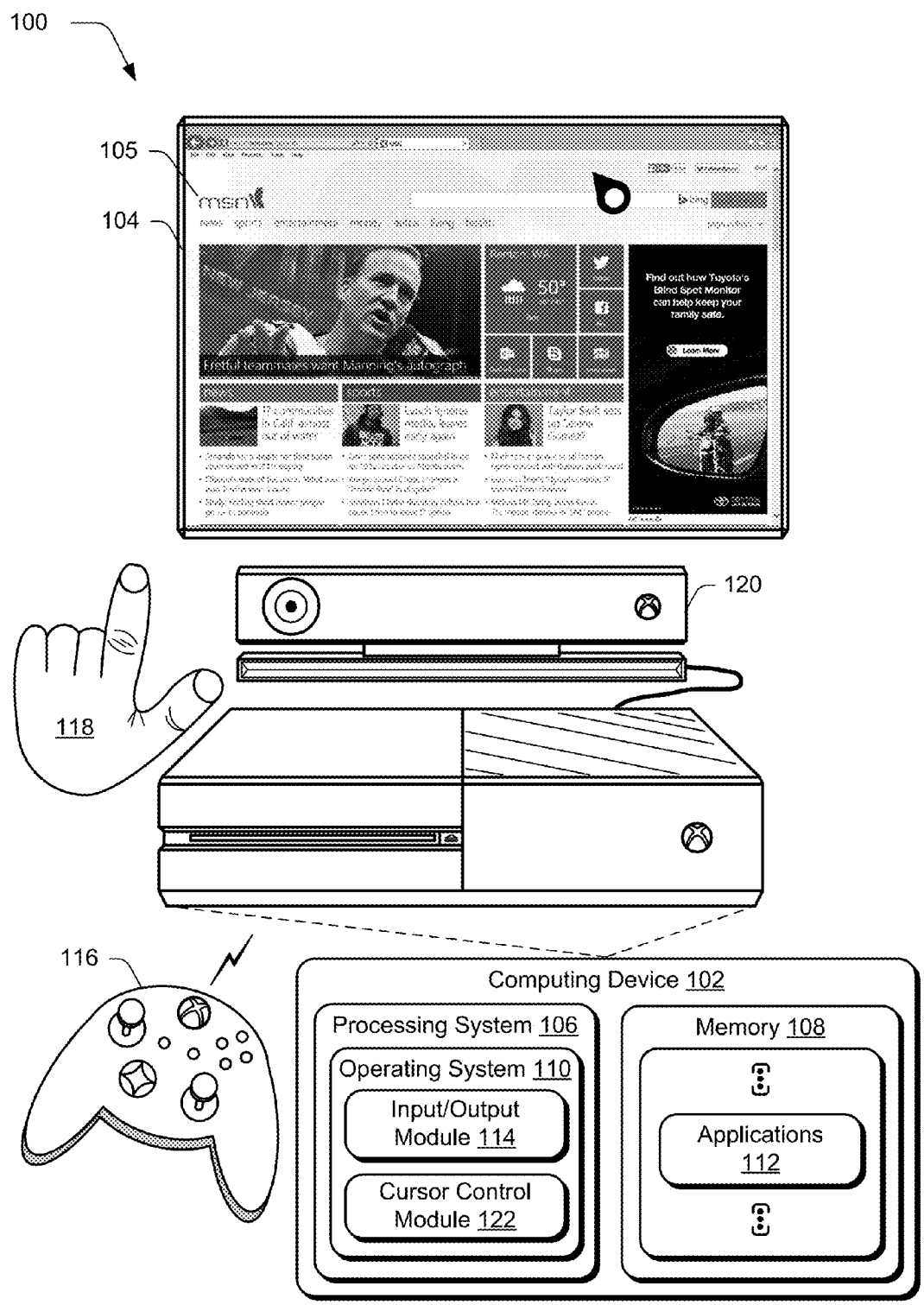
FIG. 1 is an illustration of an environment in an example implementation that is operable to employ techniques described herein.

FIG. 1 is an illustration of an environment 100 in an example implementation that is operable to employ the multi-stage cursor control techniques described herein. The illustrated environment 100 includes an example of a computing device 102 that is communicatively coupled to a display device 104. The display device 104 is depicted as displaying an example user interface 105 associated with an application, which in the illustrated example is configured as a web page rendered via a browser of the computing device 102. In the illustrated example, the computing device 102 is represented as a game console that is communicatively coupled to the display device 104 (e.g., a television), however, the computing device 102 may be configured in a variety of other ways. For example, the computing device 102 may be configured as a traditional computer (e.g., a desktop personal computer, laptop computer, and so on), a mobile station, an entertainment appliance, a wireless phone, a tablet, a netbook, and so forth as further described in relation to FIG. 8. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including a processing system 106 and an example of computer-readable storage media, which in this instance is memory 108. The processing system 106 is not limited by the materials from which it is formed or the processing mechanisms employed therein. For example, the processing system 106 may be comprised of semiconductor(s) and/or transistors (e.g., electronic integrated circuits (ICs)), such as a system on a chip, processors, central processing units, processing cores, functional blocks, and so on. In such a context, executable instructions may be electronically-executable instructions. Alternatively, the mechanisms of or for processing system 106, and thus of or for a computing device, may include, but are not limited to, quantum computing, optical computing, mechanical computing (e.g., using nanotechnology), and so forth. Additionally, although a single memory 108 is shown, a wide variety of types and combinations of memory may be employed, such as random access memory (RAM), hard disk memory, removable medium memory, and other types of computer-readable media.

The computing device 102 is further illustrated as including an operating system 110. The operating system 110 is configured to abstract underlying functionality of the computing device 102 to applications 112 that are executable on the computing device 102. For example, the operating system 110 may abstract the processing system 106, memory 108, network, input/output, and/or display functionality of the computing device 102 such that the applications 112 may be written without knowing "how" this underlying functionality is implemented. The application 112, for instance, may provide data to the operating system 110 to be rendered and displayed by the display device 104 without understanding how this rendering will be performed. The operating system 108 may also represent a variety of other functionality, such as to manage a file system and user interface that is navigable by a user of the computing device 102.

The operating system 108 is also illustrated as including an input/output module 114, which is representative of input/output functionality supported by the operating system 110. Thus, the input/output module 114 is representative of functionality relating to recognition of inputs and/or provision of outputs by the computing device 102. For example, the input/output module 114 may be configured to identify gestures and cause operations to be performed that correspond to the gestures, and so on. The inputs may be detected for processing by the input/output module 114 in a variety of different ways.

For example, the operating system 110 may be configured to receive one or more inputs via touch interaction with a hardware device, such as a controller 116 as illustrated. Touch interaction may involve pressing a button, moving a joystick or thumbstick, movement across a track pad, use of a touch screen of the display device 104 (e.g., detection of a finger of a user's hand 118 or a stylus), using a touch screen and/or controls of the controller 116, and so on. Recognition of the touch inputs may be leveraged by the operating system 110 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102), and other devices that involve touch on the part of a user or object. Thus, although the controller 116 is illustrated as a game controller, the controller 116 may be configured in a variety of other ways, such as being a remote control, a smartphone or tablet device that is configured with software and/or hardware to enable use as a controller 116, and so forth.

The input/output module 114 may also be leveraged by the operating system 110 to support a natural user interface (NUI) that may recognize interactions that may not involve touch. For example, the computing device 102 may include a NUI input device 120. The NUI input device 120 may be configured in a variety of ways to detect inputs without having a user touch a particular device, such as to recognize audio inputs through use of a microphone. For instance, the NUI input device 120 may be configured to support voice recognition to recognize particular utterances (e.g., a spoken command) as well as to recognize a particular user that provided the utterances.

In another example, the NUI input device 120 that may be configured to support recognition of gestures, presented objects, images, head/face tracking, body movements(s), and so on through use of a camera. The camera, for instance, may be configured to include multiple lenses so that different perspectives may be captured and thus determine depth. The different perspectives, for instance, may be used to determine a relative distance from the NUI input device 120 and thus a change in the relative distance.

In another example, a time-of-flight camera may be utilized to determine relative distances of objects, e.g., arms, hands, fingers, legs, torso, and head of a user. For instance, the NUI input device 120 may capture images that are analyzed by the input/output module 114 to recognize one or more motions made by a user, including what body part is used to make the motion as well as which user made the motion. An example is illustrated through recognition of positioning and movement of one or more fingers of a user's hand 118 and/or movement of the user's hand 118 as a whole. The motions may be identified as gestures by the NUI input device 120 to initiate a corresponding functions. Thus, the NUI input device 120 may be leveraged to support depth perception in a variety of different ways. The images captured by the NUI input device 120 may be leveraged to provide a variety of other functionality, such as techniques to identify particular users (e.g., through facial recognition), objects, and so on.

A variety of different types of gestures may be recognized, such a gestures that are recognized from a single type of input (e.g., a motion gesture) as well as gestures involving multiple types of inputs, e.g., a motion gesture and an object gesture made using an object such as a stylus. Thus, the NUI input device 120 may support a variety of different gesture techniques by recognizing and leveraging a division between inputs. It should be noted that by differentiating between inputs in the natural user interface (NUI), the number of gestures that are made possible by each of these inputs alone is also increased. For example, although the movements may be the same, different gestures (or different parameters to analogous commands) may be indicated using different types of inputs. Thus, the NUI input device 120 may support a natural user interface that supports a variety of user interaction's that do not involve touch.

Accordingly, although the following discussion may describe specific examples of inputs, in instances different types of inputs may also be used without departing from the spirit and scope thereof. Further, although in instances in the following discussion the gestures are illustrated as being input using a NUI, the gestures may be input using a variety of different techniques by a variety of different devices, such as to employ touchscreen functionality of a tablet computer. Other non-gesture techniques are also contemplated, such as to select one or more buttons of the controller 116.

The operating system 110 is also illustrated as including a cursor control module 122. The cursor control module 122 is representative of functionality operable to enable control of cursor movement, actions, and behaviors in response to various inputs captured from a controller or other input device. In one or more implementations, the cursor control module 122 may be configured to provide multi-stage cursor control techniques described above and below in conjunction with interactions with user interfaces for applications. In but one example scenario, the cursor control module 122 may operate in conjunction with a web browser application of a game console to facilitate cursor control for browsing activities using a directional input device, such as a game controller device or other controller/input device for the game console. In general, however, the multi-stage cursor control techniques described herein may be employed in various input scenarios including scenarios involving different types of computing devices, browsers and/or other applications, interaction across an operating system user interface, and so forth. Although illustrated as part of the operating system 110, the cursor control module 122 may be implemented in a variety of ways, such as being a standalone module, a component of one or more of the applications 112, and so on.

Multi-stage cursor control may involve application of a control algorithm having multiple stages that facilitates fine grained control over cursor movement and positioning across range of input actions and intensities. In one approach, a control algorithm is employed that provides non-linear input damping. In addition or alternatively, the control algorithm may combine spatial and temporal damping factors for input damping. Further, the control algorithm may also be configured to cause automatic cursor attraction to user interface elements in the vicinity of the cursor (e.g., when input concludes), which relieves users from having to precisely position the cursor to select elements, such as links, images, controls, etc. A variety of different control algorithms and corresponding actions may be supported by the cursor control module 122 that integrate non-linear damping and cursor attraction in multiple stages. The result is an experience that gives the users fine grained control of the cursor, making it easier to navigate between elements of an application user interface, and accordingly making the overall interaction experience with the application user interface more pleasing and efficient. Details and examples regarding these and other aspects of multi-stage cursor control techniques are described in relation to the following figures.

Figure 2:
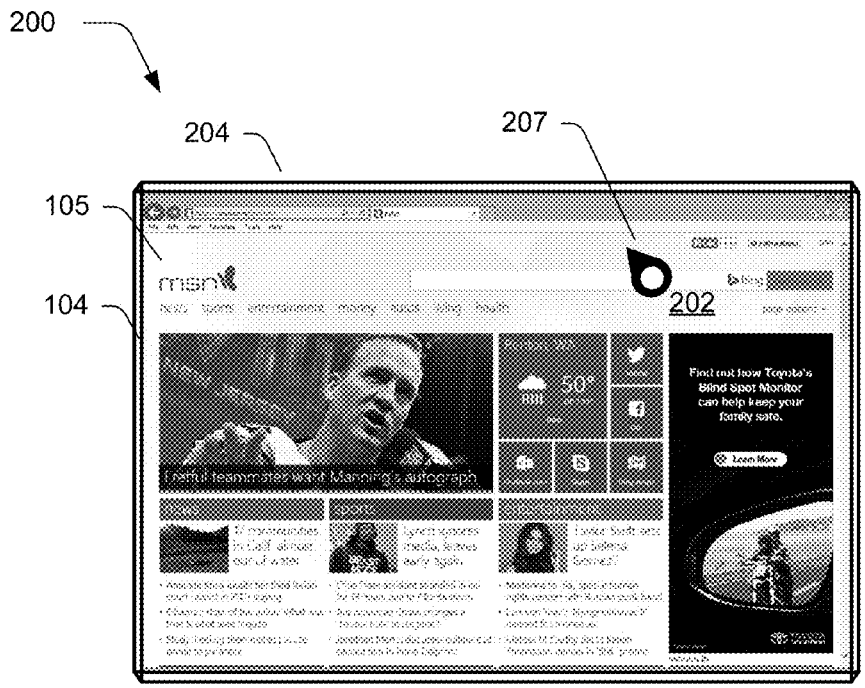
FIG. 2 depicts a system in an example implementation in which a cursor is moved in accordance with a multi-stage cursor control algorithm.
Figure 2:
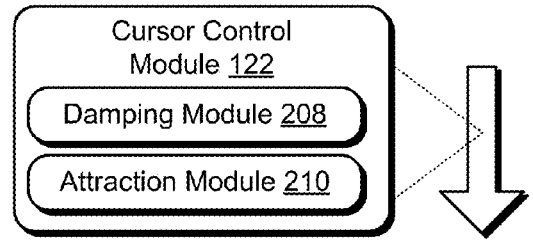
Figure 2:

FIG. 2 depicts generally at 200 an example system 200 in an example scenario in which a cursor control module 122 operates to control a cursor 202 within a user interface 105 presented via a display device 104. Operation of the cursor control module 122 is illustrated through first and second stages 204, 206. At the first stage 204, the cursor 202 is illustrated as being at a position 207. Responsive to input to manipulate the cursor 202, the cursor control module 122 may be invoked to implement a multi-stage control scheme to reposition the cursor 202 in accordance with the input. As mentioned, multi-stage control of the cursor 202 may involve a combination of input damping and cursor attraction. The cursor control module 122 of FIG. 2 is depicted as including a damping module 208 and an attraction module 210 that are representative of functionality operable to implement input damping and cursor attraction techniques, respectively, as discussed in this document. The damping module 208 and the attraction module 210 may be incorporated with, invoked by, or otherwise used by the cursor control module 122 to implement various operation described herein.

The damping module 208 may apply input damping to detected input in one or more stages. As explained in detail below, the input damping may include spatial damping and temporal damping. In one approach, spatial damping is implemented according to a polynomial relationship. The temporal damping may be implemented according to a configurable temporal damping coefficient. The temporal damping coefficient is selected to cause a ramp-up in cursor velocity over a period of time. By so doing, short duration joystick/thumbstick flicks and/or other fairly quick directional inputs associated with large spatial magnitudes may be damped to cause relatively small corresponding changes in cursor position within the ramp-up time window. This facilitates fine control over cursor movement and may reduce instances of overshooting a target element because of a quick, un-damped cursor response.

The attraction module 210 may kick in when an input sequence concludes to further refine the position of the cursor. In particular, the attraction module 210 may cause repositioning of the cursor to an element in proximity to the cursor. In one approach, the attraction is based at least in part upon an assessment of the distance of the cursor positions to the positions of elements in the user interface. The cursor is then "attracted" to a selected element based on the assessment.

For example, the second stage 206 in FIG. 2 depicts the user interface 105 having the cursor 202 repositioned to a position 212. In this example, the repositioning may occur responsive to user interaction with a controller 116 to move the cursor away from the position 207 generally towards the position 212. Movement of the cursor 202 rendered in response to input via the controller 116 may reflect application of input damping as noted. Further, positioning of the cursor 202 at the position 212 may reflect attraction of the cursor to a target element, which in the depicted example is a "health" link of the illustrated web page. Thus, input may cause movement of the cursor 202 part of the way to the position 212 to an intermediate position at which point input is concluded. Then, cursor attraction may be applied when the input concludes to cause the cursor 202 to automatically move to the "health" link at the position 212. This occurs without additional user input to cause the attraction. In an implementation, the movement of the cursor may be rendered such that the cursor appears to move responsive to the input, briefly stop when input concludes, and then settle to the target element based on the attraction sequence. Details regarding these and other aspects of multi-stage cursor control techniques are described in the following section.

Having considered an example environment, system, devices, and components, consider now a discussion of some example scenarios and procedures that illustrate details regarding multi-stage cursor control techniques.

Multi-Stage Cursor Control Implementation Details

This section describes details of multi-stage cursor control techniques in relation to various example scenarios and procedures. The scenarios and procedures may be implemented via the example systems, devices, and components of the example operating environment described in relation to FIGS. 1 and 2. Aspects of each of the representative scenarios and procedures may be implemented in hardware, firmware, or software, or a combination thereof. The procedures described below are shown as a set of blocks that specify operations performed by one or more devices and are not necessarily limited to the orders shown for performing the operations by the respective blocks.

Functionality, features, and concepts described throughout this document may be employed in the context of the representative scenarios and procedures described herein. Further, functionality, features, and concepts described in relation to different examples may be interchanged among the different examples and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used interchangeably in any suitable combinations and are not limited to the particular combinations represented by the enumerated examples.

Cursor Control Details

Figure 3:
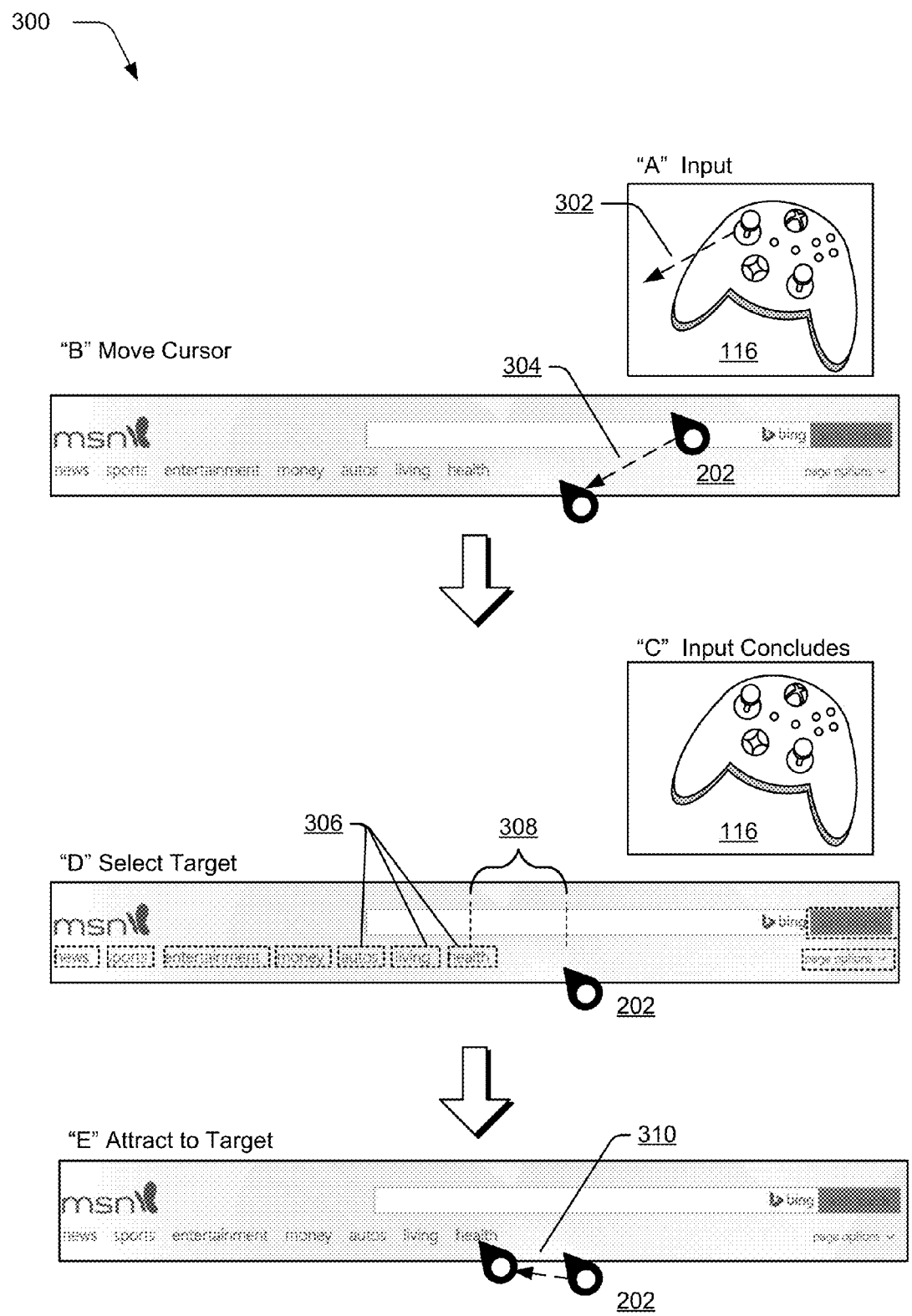
FIG. 3 depicts an example operation in a scenario for multi-stage cursor control in accordance with one or more implementations.

FIG. 3 depicts generally at 300 an example scenario in which control of a cursor is illustrated in accordance with techniques described herein. The scenario is illustrated as a sequence of operations labeled with letters "A" to "E". At "A", input to manipulate the cursor may be provided via a controller 116. The input may be detected and processed by the cursor control module 122. In response to the input, the cursor control module 122 may operate to cause corresponding movements of a cursor 202. In the depicted example, the input is represented as movement 302 of a thumbstick integrated with a game controller. As mentioned other controllers and types of input are also contemplated, such as mouse-based input, directional pad or arrow key/button input, use of a smart phone/tablet as a controller 116 to provide the input, and so forth.

At "B", the movement 302 causes corresponding movement 304 of the cursor 202 within a user interface 105 (a portion of which is shown in FIG. 3). As depicted in FIG. 3, the corresponding movement 304 is generally in the same direction of the movement 302. The amount of cursor movement and the velocity with which the movement of the cursor is rendered may be dependent upon the magnitude and/or duration of the input. For example, the corresponding movement 304 depends upon the magnitude of displacement of the example thumbstick as well as the duration of the displacement. Input damping may also be applied to the input by the cursor control module 122 as described above and below (e.g., by invoking a damping module 208 or otherwise).

At "C", the input concludes and the cursor control module 122 may recognize the conclusion of the input. For instance, when a user releases the example thumbstick and the thumbstick returns to its starting location, the cursor control module 122 may detect and interpret this as a conclusion of a particular input sequence. The cursor control module 122 may take designated action(s) responsive to the conclusion of the input, one example of which is initiating an attraction sequence under appropriate circumstances. In particular, the cursor control module 122 may implement cursor attraction as discussed herein to cause repositioning of the cursor to a target element (e.g., by invoking an attraction module 210 or otherwise). The selection of the target element may depend upon proximity of the cursor 202 to elements when input concludes.

Accordingly, operation "D" in FIG. 3 represents application of cursor attraction to select a target element. The target element may be selected from among a plurality of elements 306 contained in the user interface 105. Generally, the selection of the target element involves determining the distances between the plurality of elements 306 and the position of the cursor 202, as represented by the distance 308 between the cursor 202 and the example "health" link in FIG. 3. The selection may also involve analysis of direction of travel and movement vectors to infer an intended target when input concludes (e.g., thumbstick is released). In one or more implementations, bounding boxes for page elements are determined as represented in FIG. 3 and distances are computed between the bounding boxes and the cursor position. The target element may then be selected as an element having a bounding box that is nearest to the cursor according to the computed distances.

Operation "E" represents repositioning the cursor 202 to the target element in accordance with cursor attraction. In the illustrated example, repositioning 310 of the cursor 202 from a position at which input concludes to the target element (e.g., the example "health" link) is shown. The repositioning 310 of the cursor 202 to a selected element occurs automatically once input concludes and without further input from a user to cause the repositioning. In this way, relatively coarse and/or imprecise input provided by a user via a controller may be employed and the cursor may still be finely controlled and positioned based on such input by applying multi-stage cursor control techniques described herein.

Figure 4:
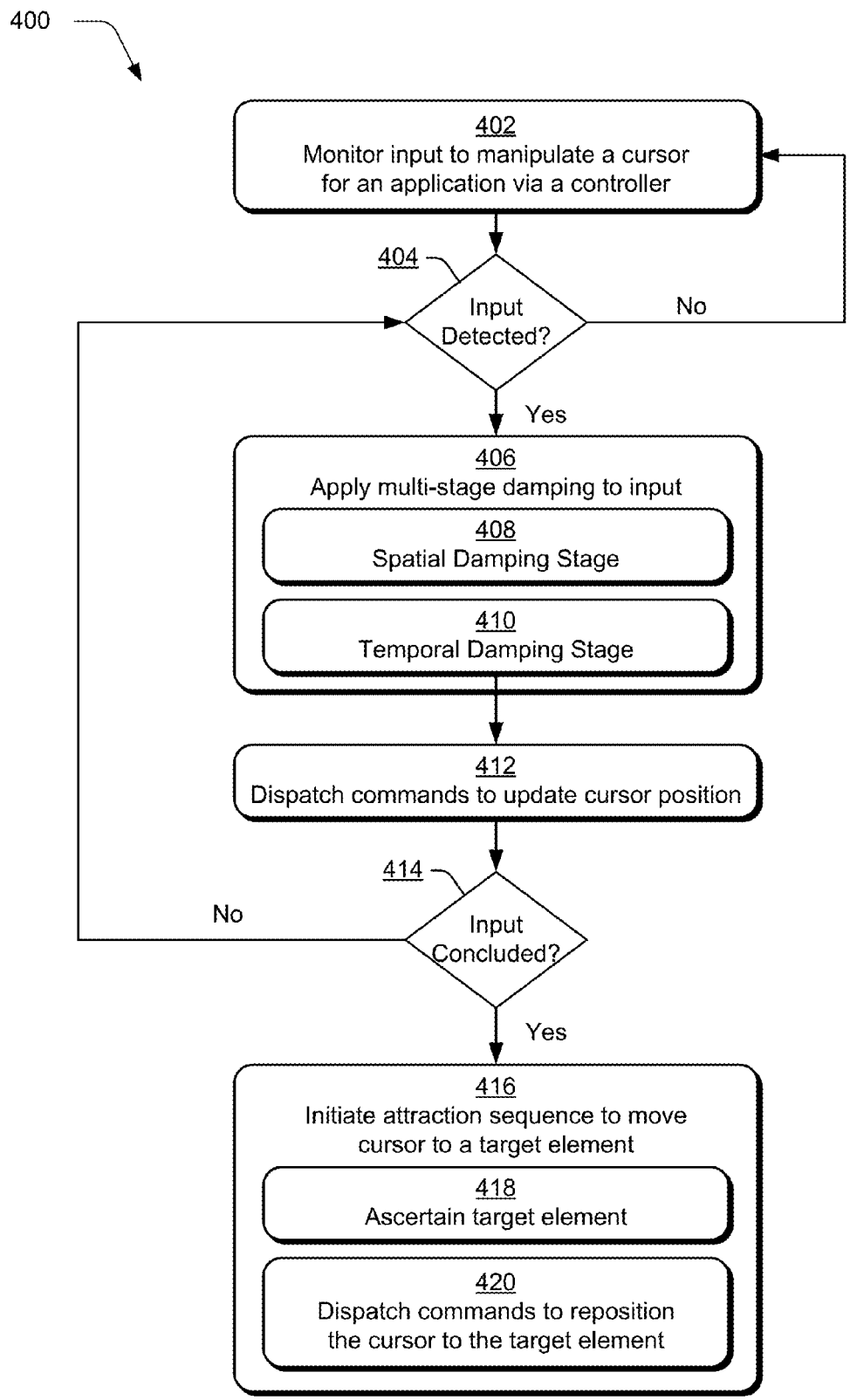
FIG. 4 depicts an example procedure for application of a multi-stage cursor control algorithm in accordance with one or more implementations.

To further illustrate cursor control details generally, consider FIG. 4 which depicts an example procedure 400 in which a multi-stage cursor control is applied to direct cursor movement. Input to manipulate a cursor for an application via a controller is monitored (block 402). For example, a cursor control module 122 may be operable to monitor inputs that are provided via a controller or multiple different controllers associated with a computing device 102. The cursor control module 122 may operate in connection with a particular application, one example of which is a browser application that may be installed on a game console or other computing device. In addition or alternatively, a cursor control module 122 may be implemented to perform input monitoring across multiple applications of a computing device.

Based on the input monitoring, a determination is made regarding whether input is detected (block 404). Here, the cursor control module 122 may recognize and distinguish between different kinds of input to interact with a computing device 102. Handling of various kinds of input may be supported by an input/output module 114 as described previously. In one approach, the cursor control module 122 may be invoked to process particular types of inputs related to manipulation of a cursor 202, such as inputs using a thumbstick, a joystick, a directional pad, touch gestures, keystrokes, and/or mouse movements to position a cursor and select items.

Thus, detected input in the context of the example procedure 400 corresponds to types inputs of input employed to manipulate a cursor. As long as such input is not detected per block 404, the procedure returns to block 402 and monitoring may continue. When input is detected, multi-stage cursor control techniques may be applied to handle the detected input and control movement of the cursor accordingly. In particular, multi-stage damping is applied to the input (block 406). The multi-stage damping may include both a spatial damping stage (block 408) and a temporal damping stage (block 410) details of which are provided in the following section titled "Input Damping Details." The particular algorithm used for damping may be dependent upon various factors including but not limited to the input device that is used, the type of device, the type of input (e.g., gestures, keystrokes, game controller input, touch swipes, etc.), and so forth. Thus, different multi-stage damping algorithms may be applied in different scenarios. Based on the multi-stage damping, commands are dispatched to update the cursor position (block 412). Here, the cursor control module 122 may operate to provide commands to an application to direct rendering of the cursor. The rendering of the cursor by the application therefore reflects input damping that is applied to detected inputs. Commands may be configured in any suitable format to indicate a drawing path, velocity, and/or behaviors for the cursor.

A determination is then made regarding whether input is concluded (block 414). The determination may be based upon a timer and/or a designated timeout period that begins to run in the absence of input signals. The timeout period may be configurable and generally is on the order of a few hundred milliseconds. An individual input sequence may last from detection of input per block 404 until a determination is made that input has concluded (e.g., the individual input sequence has stopped) per block 414. This may occur for example when a user releases a thumbstick of a controller, stops moving a mouse, removes a finger from a touch input device, and so forth.

As long as input for an individual input sequence is continued and/or is interrupted for less than the designated timeout period, the determination per block 414 is negative meaning that input has not concluded. In this case, the procedure returns to block 404 where additional detected input (e.g., the continuing input) is processed to apply damping and update the cursor position accordingly. When a determination is made at block 414 that input is concluded, an attraction sequence is initiated to move the cursor to a target element (block 416). The attraction sequence may include operations to ascertain a target element (block 418) and dispatch commands to reposition the cursor to the target element (block 420). For example, a cursor may be attracted to a target element that is selected as shown and described previously in relation to the example of FIG. 3. Additional examples and details regarding techniques for cursor attraction are discussed in a section below titled "Cursor Attraction Details."

Input Damping Details

This section describes details regarding input damping that may be employed for multi-stage cursor control techniques discussed throughout this document. Input damping may be applied to input that is provided via various controllers 116 including but not limited to game controllers, tablet devices, mobile phones, joystick devices. At least some controllers may include thumbsticks, directional pads, touchpads, touch screen or other input devices through which input may be generated. In general terms, input damping is applied to input signals according to an algorithm configured to specify damping factors designed to modify the input signals to control cursor response. For example, damping factors may operate to modify the magnitude of raw input signals to control velocity or rate of cursor movement across a range of input magnitudes. Damping factors may be applied to each component of an input vector generated via a controller to manipulate a cursor, such as to x and y components associated with a two-dimensional coordinate space of a user interface and/or display device or vectors of a polar coordinate system. Of course, it is contemplated that comparable input damping techniques may also be employed in other input scenarios, such as in connection with x, y, and z components of a virtual environment that implements a three-dimensional coordinate space for a user interface.

Thus, given a range of input (e.g., normalized input range from −1 to 1) for an input vector, the input damping algorithm may produce corresponding component values that specify the velocity components for cursor responses to detected input. As the name suggests, the input damping may cause "damping" of input by applying factors to reduce the magnitude of input signals by percentages computed according to the algorithm. However, it is contemplated that factors designed to increase the magnitude of input signals or components thereof may be applied in some scenarios. Different factors may be computed for individual components or alternatively a single, overall factor may be generated and applied to each of multiple components.

The input damping algorithm may describe a functional relationship between raw input and "damped" input employed for cursor control. In an implementation, the input damping algorithm may also depend upon knowledge regarding the position of page elements relative to the cursor. Such information may be used to infer potential target elements and may be used to modify damping coefficients accordingly based on relative position/distances between the cursor and elements. Knowledge regarding the position of page elements may be derived by parsing of a representation of the page (e.g., the page DOM) as discussed previously. Various different controls schemes and cursor response patterns may be implemented by configuring this functional relationship in different ways to specify different combinations of factors under various conditions. As noted previously, the techniques described herein may involve non-linear functional relationships in one or more implementations. Additionally, the input damping algorithm may be configured to employ spatial and temporal damping individually or in combination. In other words, the input damping algorithm may reflect a non-linear functional relationship that incorporates either or both of spatial considerations or temporal considerations.

In one or more implementation, spatial damping is implemented by polynomial damping of input signals that may correspond to displacement of a thumbstick or joystick, velocity and/or length of touch-based swipes, magnitude associated within interaction via directional pad or directional buttons, or other input mechanism. Polynomial damping may be expressed in the following generalized form:

$$(\text{damping factor}) = (\text{input value})^{\text{exponent}}$$

where "input value" is the normalized raw input value generated via a controller, the "exponent" may be selected as an integer greater than 1, and the "damping factor" is a non-linear factor generate by the computation.

The functional relationship reflected by the above expression may be tunable by a developer and/or by a user by changing the value for the exponent, which causes a corresponding change in the cursor response.

To further illustrate, consider a scenario in which a cursor is being controlled by a thumbstick of a game controller. In this scenario, input signals in a normalized range of −1 to 1 may be generated based on displacement of the thumbstick from a starting position. In some instances, a deadzone may be defined surrounding the starting position, in which case the displacement may be an amount of displacement outside of the deadzone. The thumbstick model represents one example device by which a user may provide analog two-dimensional input that may be translated to direction and velocity values to manipulate a cursor.

Figure 5A:
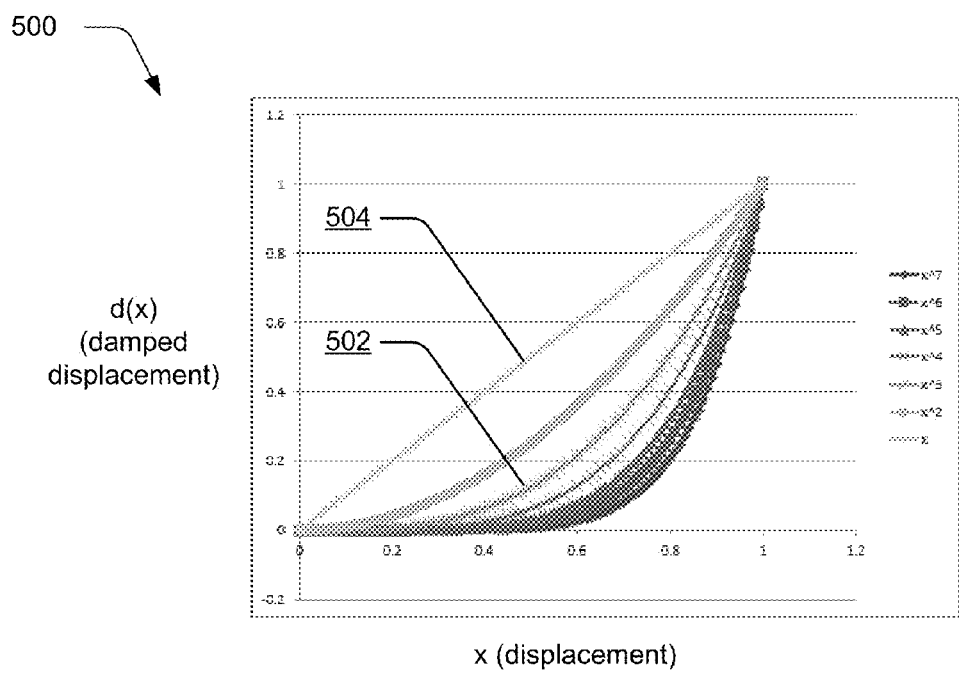
FIG. 5a depicts example polynomial curves for spatial damping in accordance with one or more implementations.

In one or more implementations, the cursor control module 122 is configured to utilize polynomial curves to derive spatial displacement factors for thumbstick input (or input from another type of controller). By way of example, FIG. 5a depicts generally at 500 a graph showing a number of polynomial curves for the relationship of an x component of velocity, d(x), to the displacement value for the thumbstick, x. In accordance with the general expression noted above, the curves have the form $d(x)=x^{\text{exponent}}$. Although, the exponent may be set as any integer greater than 1, in practice the value for the exponent may be constrained by an upper bound. For example, the cursor control module 122 may be configured to support exponent values in the range of 2 to 7 as represented by the example curves in FIG. 5a. Other ranges for the exponent values are also contemplated.

Considering the example curves of FIG. 5a, with a displacement of 50% or 0.5 from the deadzone in both the x and the y directions, the output cursor velocity along the cubic curve (e.g., exponent=3) may be computed as a 12.5% of the maximum velocity as shown at point 502. In contrast, the output cursor velocity is computed as 50% of maximum cursor velocity according to a linear mode as shown at point 504. By tuning the exponent value the amount of damping may be controlled to provide a gradual cursor response (in comparison with a linear approach) and quickly stop the cursor when input concludes.

An input damping algorithm may incorporate temporal damping individually or in combination with spatial damping. Temporal damping may be applied to control cursor movement in response to relatively short duration input with large magnitude, such as brief flicks of a thumbstick or quick touch-based swipes/scrolls. For example, brief duration input actions such as the examples just mentioned may be configured to cause a fairly small cursor response. This may be accomplished by using a temporal damping coefficient to ramp-up cursor velocity over a period of time. By so doing, motion of a cursor may be finely controlled such as within an areas of a user interface having a dense sets of links that may be difficult to navigate using an un-damped approach.

The temporal damping coefficient may be derived in various ways. For example, the temporal damping coefficient may be computed according to a functional relationship established between a time of displacement and the value of the coefficient. In at least some implementations, a linear relationship is employed although polynomial expressions, such as those discussed for spatial damping, and/or other functions are also contemplated. In any case, the temporal damping coefficient is configured to vary over a ramp-up time period from a configurable initial value up to a value of 1 after the conclusion of the ramp-up.

During the ramp-up period, temporal damping coefficients computed according to the functional relationship are applied to damp cursor velocity by multiplying input values by corresponding percentages (e.g., coefficients of 0 to 1 that map to percentages of 0% to 100%). After the ramp-up period, the temporal damping coefficient is set to 1, meaning the input values are multiplied by 1 and the temporal damping effectively stops.

Figure 5B:
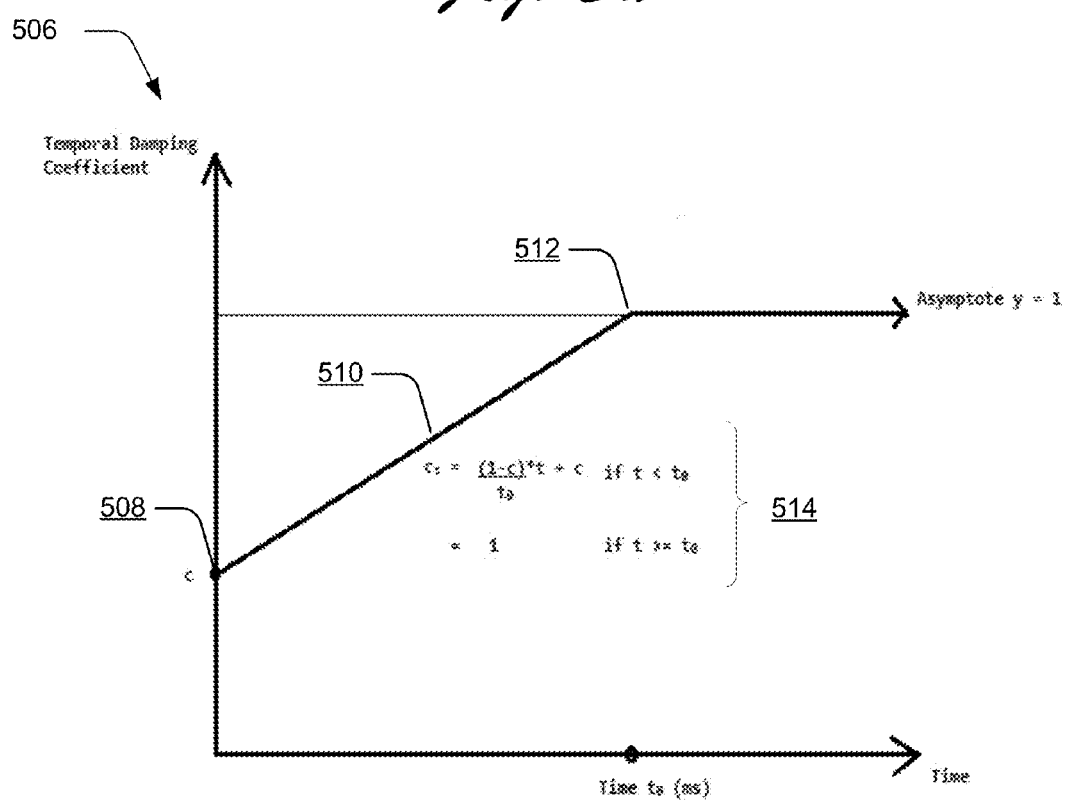
FIG. 5b depicts an example graph of a variable coefficient for temporal damping in accordance with one or more implementations.

FIG. 5b depicts generally at 506 an example functional relationship established between a time of displacement and values for the temporal damping coefficient. An initial value for the coefficient c(t) is shown at point 508, which corresponds to the y-intercept. As noted, the initial value for the coefficient c(t) may be tunable by a developer and/or by a user. In this example, a linear ramp-up is depicted at 510, although non-linear implementations are also contemplated. The ramp-up period runs from time=0 to time=$t_0$ (ramp-up threshold time). The $t_0$ ramp-up threshold time $t_0$ may also be configurable, but is typically set to some fraction of a second, such as five hundred milliseconds. By way of example and not limitation, values between about two-hundred milliseconds and one second may be set for $t_0$. When the ramp-up period is completed, the value of c(t) is set to a 1 as shown at point 512. The value of c(t) then remains at 1 until the input sequence concludes (e.g., c(t) follows the line y=1.). Accordingly, a linear approach to temporal damping is defined by the graph shown in FIG. 5b and the corresponding expression 514. Rather than having a linear relationship as shown for the expression 514 a higher order polynomial expression may be designated. The end result is that a short duration "flick (e.g., gross motion of the thumbstick followed by an abrupt release) of a thumbstick, or other short duration input (e.g., at times below the ramp-up threshold time $t_0$) provided via a controller, may be controlled to cause a damped cursor response on the screen that results in reduced, fine cursor movement in comparison to an undamped response.

As noted, an input damping algorithm may be configured to employ spatial and temporal damping as just described on an individual basis. Additionally or alternatively, the input damping algorithm may combine spatial and temporal damping to define cursor velocity as a function of both spatial displacement and time. For example, in accordance with the above discussion of spatial and temporal damping, velocity values for detected input may be determined by multiplying spatially damped displacement d(x) by the temporal damping coefficient c(t). Values for the temporal damping coefficient c(t) and/or spatially damped displacement d(x) may be computed for each frame/rendering update of the user interface (e.g., according to a refresh rate for frame rendering) and cursor velocity components may be determined according to these computed values. Here, component velocities for x and y directions in a two-dimensional input scenario may be expressed as v(x)=d(x)*c(t) and v(y)=d(y)*c(t), respectively. If applicable, component velocity for a z direction in a three-dimensional scenario may be similarly expressed as v(z)=d(z)*c(t). It is additionally noted that a polar coordinate system may be employed rather than using Cartesian coordinates. In this approach, damping coefficients may be applied to a vector in the polar coordinate space having a particular direction and magnitude. A variety of other examples are also contemplated.

Cursor Attraction Details

This section describes details regarding cursor attraction that may be employed for multi-stage cursor control techniques discussed throughout this document. The cursor attraction may be employed on an individual basis as well as in conjunction with input damping techniques discussed herein. While the input damping algorithm operates while cursor input is active, the cursor attraction part of is configured to kicks in right after input concludes, such as when a user releases a thumbstick. Generally, cursor attraction involves repositioning of the cursor to an element in proximity to the cursor. In one approach, the attraction is based at least in part upon an assessment of the distance of the cursor positions to the positions of elements in the user interface. The cursor is then "attracted" to a selected element based on the assessment.

Figure 6:
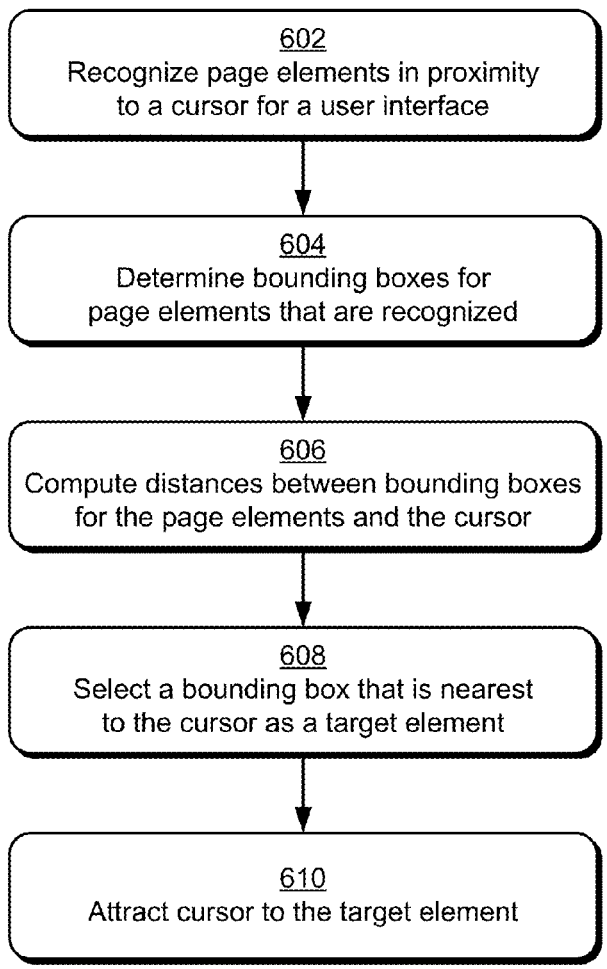
FIG. 6 depicts an example procedure for application of a cursor attraction sequence in accordance with one or more implementations.

FIG. 6 depicts an example procedure 600 in which a cursor attraction sequence is invoked to cause cursor attraction to a target element. The attraction sequence represented in FIG. 6 may be initiated in various ways. In one example, the procedure 600 may be initiated in connection with an overall multi-stage cursor control scheme, such as the example procedure 400 of FIG. 4. More generally, the cursor attraction sequence(s) described herein may be triggered upon conclusion of a particular input sequence. In addition or alternatively, aspects of the procedure may also occur during a particular input sequence (e.g., while input is active) in order to prepare in advance to attract the cursor to a target element when input concludes.

In particular, page elements in proximity to a cursor for a user interface are recognized (block 602). Bounding boxes are determined for the page elements that are recognized (block 604). Then, distances are computed between the bounding boxes and the cursor (block 606). For example, the cursor control module 122 may be configured to recognize page elements within a designated area of interest surrounding a cursor position. Processing to recognize page elements may occur "in advance" when cursor input is active, such as in response to each cursor move event. Alternatively, the recognition of elements and additional operations for an attraction sequence may be triggered "on-demand" when conclusion of input is detected (e.g., as discussed in relation to block 414 of FIG. 4). The approach described herein may be applied to web pages that are rendered via a browser as well as other user interfaces associated with different applications 112.

The designated area of interest may be an area having a selected size and/or number of pixels that contains elements within relatively close proximity to the cursor position. The area of interest may have default dimensions and/or may be configurable to set/tune the dimensions. By way of example and not limitation, the area of interest may be configured as a circular region or boxed region around the cursor. The area of interest may also be other shapes, such as a teardrop shape that is based in part upon cursor velocity at the time input concludes. In other words, the area of interest may set a threshold distance(s) beyond which elements may be eliminated from consideration as targets for attraction and within which elements may be recognized as potential targets. In addition or alternatively, the area of interest may correspond to a particular section or division of a document, such as block or collection of elements grouped together using "div" tags or other element grouping techniques. Thus, when one or more elements are found within the area of interest, an assessment to find a target element based on computed distance proceeds. On the other hand, if the area of interest does not contain any suitable elements, there are no potential targets and remaining attraction operations may be skipped.

When recognition is triggered, the cursor control module 122 may operate to traverse a representation of elements within a subject user interface to find elements that are contained within the designated area of interest. In the case of web pages, this may involve parsing the document object model (DOM) to identify elements within in an area of interest around the cursor. Other representation of elements are also contemplated such as a mark-up language, object-based, or script documents that define the structure of a user interface including at least indications regarding the relative positions of elements one to another.

Based on parsing of a suitable representation of elements, the cursor control module 122 is able to recognize elements that are included in the area of interest. Then, bounding boxes for any elements that are recognized are determined. The bounding boxes may be defined via the page DOM (or other structural representation of elements) and may be ascertained based on the parsing of the page/user interface. The bounding boxes may then be used to compute distances between the cursor and the various elements that are within the area of interest.

Having determined distances between the cursor and one or more candidate elements, a bounding box that is nearest to the cursor is selected as a target element (block 608). Then, when cursor attraction is triggered, the cursor is attracted to the target element (block 610). For example, the cursor control module 122 may perform analysis to compute the distances from the cursor to different candidate elements and compare the distances to one another. A candidate element that is associated with a shortest distance to the cursor is then selected as a target element for cursor attraction. Ties may be resolved in various ways, such as by considering the direction of input in addition to the distances. The cursor control module 122 may post coordinates of the bounding box for the target element to storage for use when cursor attraction is triggered.

When processing for the attraction sequence is performed "on-demand," the determined coordinates or the bounding box may be employed right away to attract the cursor to the target element. Alternatively, if computations are performed "in advance," a target element may be computed and recomputed for each cursor move event on an ongoing basis as long as a particular input sequence continues. The posted coordinates may be updated to reflect any changes in the target element based on ongoing movement of the cursor. In order to optimize performance and/or avoid unnecessary posting, coordinates may be determined for each event, but are not posted unless the target element has changed. However, to account for cases in which a user has disengaged for a while and then re-engaged, a timeout may be specified to control when coordinates get posted or reposted even if the target element remains the same. For example, if a time period set by the timeout has passed without posting, a posting of coordinates for the nearest element may be forced even if the target element remains the same. By way of example and not limitation, the timeout may be set within a range of about 500 milliseconds to 2000 milliseconds.

Additionally, in one or more implementation, the cursor control module 122 may be further configured to compute an "offset box" for the target element in some scenarios. The offset box represents a box within the bounding box for the target element that contains portions of the element that are selectable to invoke corresponding functionality. The offset box may be used for attraction instead of the bounding box itself because the bounding box may include some blank space that is inactive. Thus, if the cursor was repositioned to the blank space then the cursor would not be at an active location. For example, many text elements in web pages are active when the cursor is positioned over the actual text, but are inactive if the cursor is positioned on surrounding whitespace within the bounding box.

To compensate for this effect, the offset box may be computed by modifying one or more dimensions of the bounding box by a configurable offset value. By way of example and not limitation the offset value may be expressed as a number of pixels, a scale factor, a percentage size reduction, and so forth. In one particular example, the bounding box for the target element is reduced by offsetting at least one side of the bounding box inward according to a pixel value that may be set in a range of about 0 to 10 pixels. For example, if an offset of 5 pixels is employed then attraction will place the cursor 5 pixels within the bounding box for the target element to ensure that the cursor is focused on active portions of the element (e.g., selectable links, text, controls, etc.).

The cursor control module 122 may include or make user of a timer that is synchronized to rendering updates for a graphics processing system. For each timer frame (which occurs at a refresh rate such as 60 frames/second), the cursor control module 122 computes a moving average for the cursor velocity in the last 10 frames. The moving average may be used to send commands effective to cause rendering of movement of the cursor in accordance with detected input. As noted previously, the input signals may be damped according to input damping techniques described herein and cursor movement may reflect the damping (spatial and/or temporal) in some cases.

Cursor attraction kicks in to cause repositioning of the cursor to a target element computed as discussed herein upon a determination that a particular input sequence has concluded. This may occur for example when a thumbstick is released, when a user stops providing touch input, and so forth. Detecting conclusion of an input sequence may occur in any suitable way. In or more implementations, a tick count associated with the timer for rendering updates is maintained and may be employed to recognize when input concludes. The tick count may be updated each time an input event occurs that result in a cursor move (e.g., cursor move events). The cursor control module 122 may monitor the tick count and make determinations regarding when to enable or disable cursor attraction according to the tick count. For example, when updates to the tick count stop for a designated amount of time (e.g., a tick count timeout), operations to generate commands for cursor attraction may be triggered.

Accordingly, the cursor control module 122 may start running cursor attraction upon a determination that input has concluded. Generally, this involves generating commands to cause appropriate cursor movement and/or causing commands to be injected into a rendering queue for the cursor. In one or more implementations, the commands for cursor attraction may be run as a simulated input modality that runs parallel to the other controller input modalities running within the system (such as for a game controller, tablet or mobile phone, or other controller 116). After making a determination that cursor input has just stopped, the coordinates of a target element that are stored in advance may be retrieved or the target element may be ascertained on demand. Then, the distance from the cursor to an attraction point on the bounding box (or offset box if the offset feature is utilized) for the target element is computed. The attraction point may correspond to a nearest point to the cursor on the bounding box, although other points on the box or even within the box may be used in different implementations. Further, a floating point cursor delta per frame for movement of the cursor from its current position to the attraction point is determined. The floating point cursor delta per frame represents the amount of cursor movement to inject per frame in order for the cursor to reach the attraction point. Decimal parts of floating point deltas may be propagated between frames to ensure that the cursor motion is smooth. In operation, a move event to move the cursor closer to the attraction point may be computed based on the floating point cursor delta and injected for each timer frame until the cursor has reached the attraction point.

In one or more implementations, the cursor control module 122 may be additionally configured to disable or otherwise prevent cursor attraction in some scenarios. For example, the cursor control module 122 may implement a scheme to selectively control when attraction back to an element along the movement path of the cursor is enabled or disabled. In particular, attraction back may be enabled to control overshoot situations in which a user has engaged the cursor for a while trying to get to an element, but unintentionally ends up overshooting the element. On the other hand, in a situation in which a user intentionally moves the cursor off of an element attraction, the user likely does not want the cursor to attract back to that element so attraction back may be disabled.

In order to distinguish between and handle attraction back for these different situations, the cursor control module 122 may be configured generally to disable attraction back to an element (e.g., attraction back along a path from which the cursor reached its current position), but also to ascertain when an overshoot condition occurs and enable attraction back in this situation. To do so, the cursor control module 122 may use an indication of whether there is an overshoot condition in connection with an indication of the direction of attraction relative to the cursor movement to determine whether or not to apply cursor attraction.

For example, the control module 122 may obtain an indication of the direction of attraction relative to the cursor movement in any suitable way. If the directions are opposite, cursor attraction to the currently selected target element may be disabled, unless an overshoot condition is indicated. In one approach, the relative directions may be determined by computing a dot product of an instantaneous velocity vector for the cursor attraction with the moving average vector of the cursor velocity (e.g., average velocity of the cursor when user input was active). If the dot product is negative, this means that the velocities are in opposite directions and accordingly cursor attraction may be skipped for the identified target element. If the dot product is positive, this means that the velocities are in the same directions and cursor attraction is performed to reposition the cursor to the identified target element.

Even if the dot product is negative, cursor attraction may also occur if an overshoot condition is detected. In order to detect overshoot condition, the cursor control module 122 may track whether the cursor has been previously attracted to a current target element. One way this may occur is by setting a Boolean flag (or other suitable indicator) associated with the target element indicative of whether attraction has occurred (e.g., within a given time frame). The Boolean flag is set to true if cursor movement for an input scenario begins at the element (e.g., zero velocity at the position of the element which indicates that the element had cursor focus). If the Boolean flag is true for an element, attraction back to the element is disabled per the dot product calculation or other indication of relative direction. On the other hand, if the Boolean flag is false for the element, then attraction back to the element is enabled, which allows the system to handle overshoot situations. By way of example, if a user overshoots a link in a web page with cursor manipulation, the dot product that is computed will be negative, but the Boolean flag for the element is false since the cursor did not begin motion on the element. Accordingly, the cursor attraction back to the link occurs, which provides the user with the result that was intended. The Boolean may be reset when the cursor times out, when target element changes, or once the cursor has moved outside of the vicinity of the element (e.g., element is no longer in the area of interest).

The input damping and cursor attraction techniques described herein may be employed together to provide multi-stage cursor control. The multi-stage cursor control techniques provide an experience that enables fine grained control of the on-screen cursor, making it easier to navigate between links on a page, thus making the overall interaction experience more pleasant and useful. The multi-stage cursor control techniques may also enable new interaction scenarios and gestures, one example of which is flick and attract gestures discussed just below.

Flick and Attract Gestures

In one or more embodiments, the cursor control module 122 is configured to support flick and attract gestures to facilitate navigation between elements within a user interface. The flick and attract gestures involve brief directional input via a controller 116 that is associated a relatively large magnitude. Examples of such input include but are not limited to a flick of thumbstick, brief displacement of a joystick, a quick swipe on a touchscreen and so forth. Such brief directional inputs are referred to herein collectively as "flicks." Flicks may be recognized by the system and processed to cause a corresponding response in the position of the cursor. A threshold amount of displacement and/or input magnitude may have to be reached in order for input to be recognized as a flick. For example, input associated with fifty percent or greater of a maximum displacement or input magnitude may be characterized as flicks whereas input having values lower than fifty percent may not be considered flicks. Similarly, a duration threshold may be associated with flicks such that input that exceeds the duration threshold is not characterized as a flick.

Accordingly, in response to recognition of flicks, the cursor control module 122 may cause attraction as described in this document to reposition the cursor to a nearby element. The flick and attract behavior works in part due to damping that is applied to the brief directional input associated with flicks. In the absence of damping, the cursor velocity jump up quickly in response to flicks, which may not allow sufficient time for the attraction and may cause jerky cursor behavior. The flick and attract feature is well-suited to navigation in portions of user interface having a dense arrangement of elements such as a list of links, a collection of tiles or icons, a menu, an image thumbnail mosaic, etc. In such portions of a user interface, the flick and attract feature may be employed to navigate efficiently and effectively between elements, such as up and down a list of links on a page and/or back and forth between collections of elements. Additional details and examples are now discussed in relation to the example flick and attract scenarios depicted in FIGS. 7 and 8.

Figure 7:
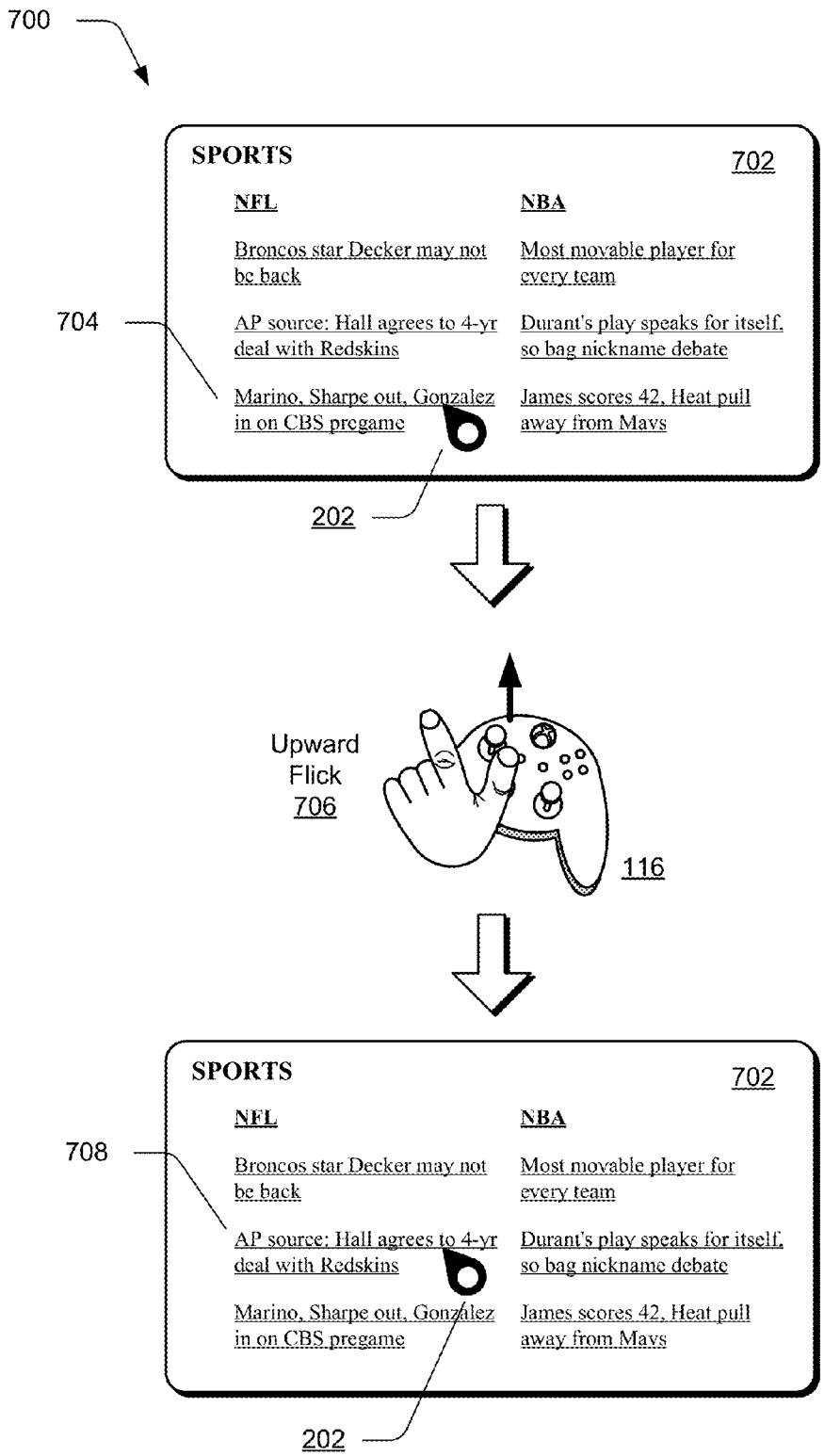
FIG. 7 depicts an example scenario to illustrate aspects of a flick and attract gesture in accordance with one or more implementations.

In particular, FIG. 7 depicts generally at 700 an example scenario that represents use of a flick and attract gesture to navigate between elements. Here, a representative user interface 702 that contains various elements is shown. The user interface in the example is configured a sports web page that includes links to sport related stories. The web page may be rendered via a browser associated with a game console or other computing device. Initially, a cursor 202 is shown as being directed to a link 704 of the web page. In order to navigate between the various links, a user may simply use a controller 116 and input a flick in the direction the user would like the cursor to travel. This causes movement of the cursor in the selected direction and attraction of the cursor to a target element in that direction that may be ascertained as discussed previously. This action is represented in FIG. 7 by an upward flick 706 that may be produced by a brief displacement upward and release of a thumbstick on a game controller (as shown) or via other comparable manipulation of a different kind of controller. In response to the upward flick 706 the cursor may move off of the link 704 in the upward direction and then attraction kicks in to automatically reposition the cursor on the link 708. Notably, the flick is sufficient to cause this attraction to the next element in the direction of the flick and the user does not have to continue input until the cursor reaches the element or precisely position the cursor upon the element. Naturally flicks may occur in any direction to cause corresponding cursor movement including up/down, left/right, diagonally at different angles, and so forth.

Figure 8:
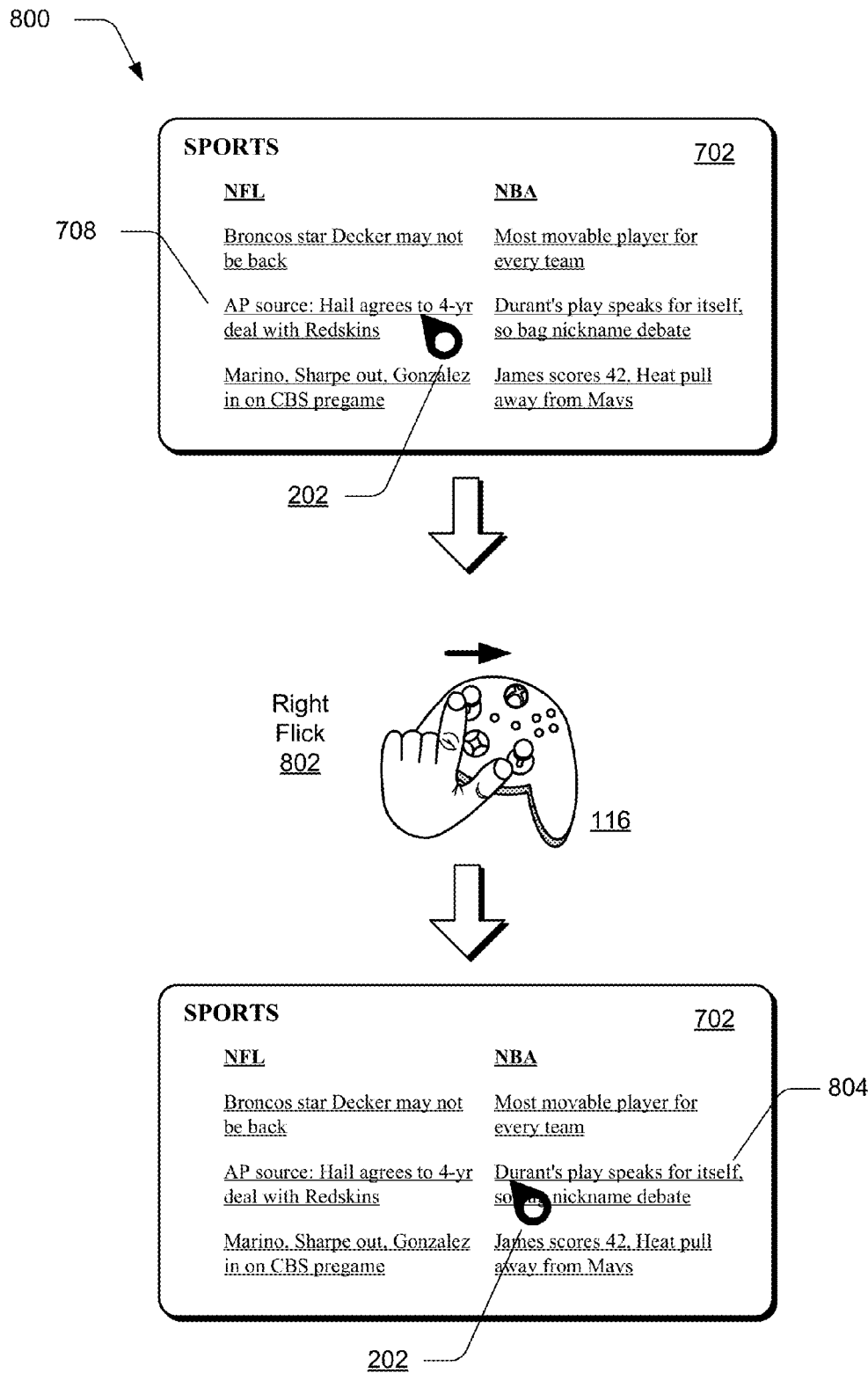
FIG. 8 depicts another example scenario to illustrate aspects of a flick and attract gesture in accordance with one or more implementations.

For instance, FIG. 8 depicts generally at 800 another example scenario that represents use of a flick and attract gesture to navigate between elements. Here, a right flick 802 is depicted that may be applied following attraction of the cursor 202 to the link 708 as depicted in FIG. 7. The right flick 802 may be produced by a brief displacement to the right and release of a thumbstick on a game controller (as shown) or via other comparable manipulation of a different kind of controller. In response to the right flick 802, the cursor 202 may move off of the link 708 to the right and then attraction kicks in to automatically reposition the cursor on the link 804, which in this example is in a different column of links.

Successive flicks is various directions may be used to navigate up and down, back and forth, right and left, diagonally across, and otherwise between elements of a user interface. As mentioned, the behavior of the cursor that is rendered may give an appearance that the cursor moves off the current element, stops briefly (perhaps for a barely perceptible amount of time), and then is drawn to the next element due to attraction. This provides a straightforward and effective mechanism for users to navigate between elements contained in a page or document.

Having considered example details of multi-stage cursor control techniques, consider now a discussion of an example system and device that may be employed to implement the described techniques.

Example System and Device

Figure 9:
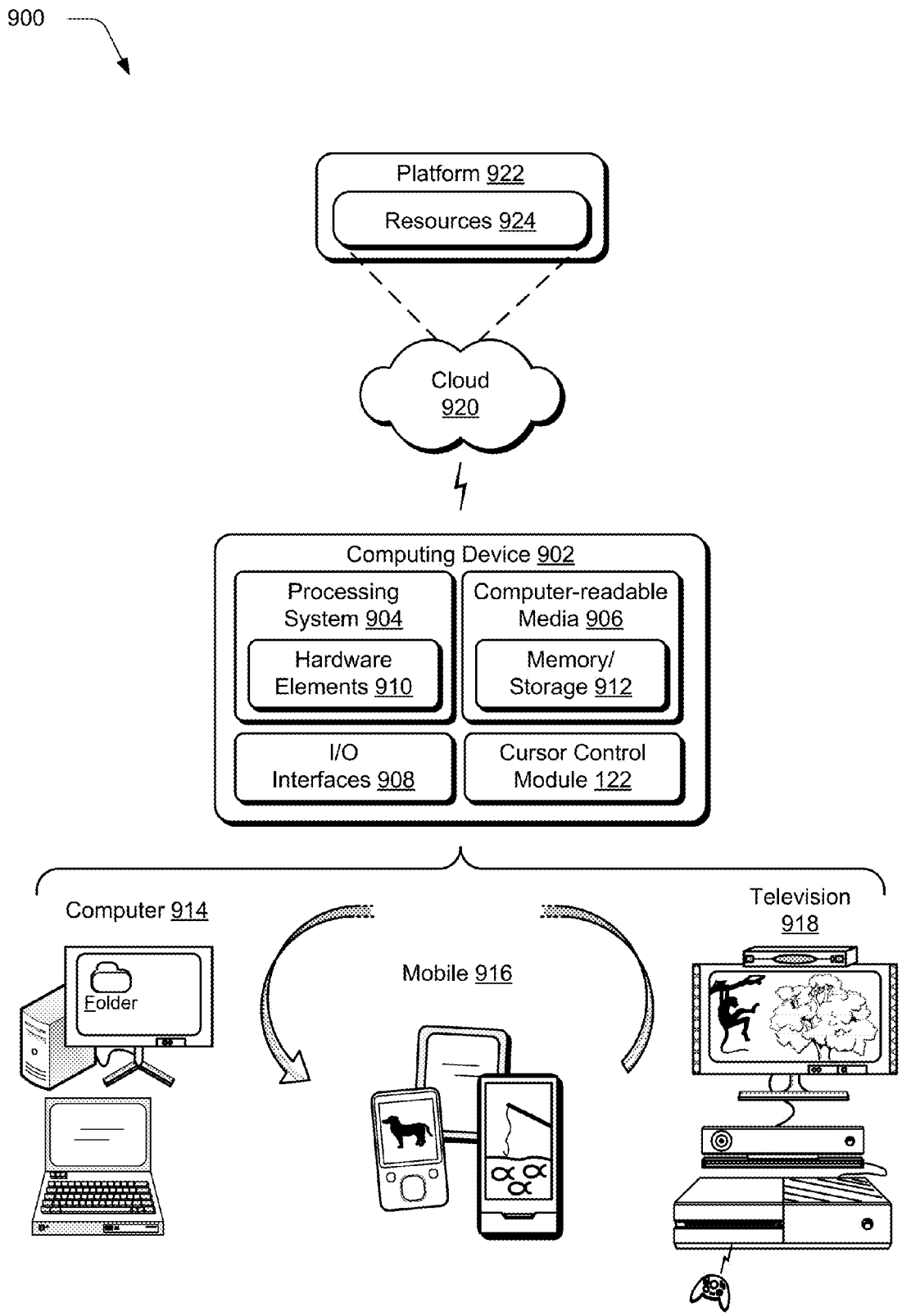
FIG. 9 illustrates various components of an example device that can be implemented as any type of portable and/or computer device as described with reference to FIGS. 1-8 to implement aspects of the techniques described herein.

FIG. 9 illustrates an example system generally at 900 that includes an example computing device 902 that is representative of one or more computing systems and/or devices that may implement the various techniques described herein. This is illustrated through inclusion of the cursor control module 122 on the computing device 902. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable storage of information in contrast to mere signal transmission, carrier waves, or signals per se. Thus, computer-readable storage media does not include signals per se or signal-bearing medium. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method implemented by a computing device comprising:
monitoring to detect input signals provided via a controller for the computing device to manipulate a cursor within a user interface for an application, the detected input signals representing a controller displacement of the controller from a starting position, the controller displacement having displacement components representative of a magnitude and a direction of the controller displacement;
applying multi-stage damping to the detected input signals, the multi-stage damping comprising:
normalizing the detected input signals;
deriving spatial damping factors according to a polynomial curve that reflects a nonlinear relationship between a displacement component of the controller displacement and a spatially damped displacement component of the controller displacement, the spatial damping factors depending on the magnitude of the normalized detected input signals and a predetermined exponent, the spatial damping factors configured to reduce the magnitude of the displacement component of the controller displacement;
deriving temporal damping coefficients configured to vary based on a time duration of the detected input signals associated with the controller displacement to produce a ramp-up of cursor velocity over a period of time, the temporal damping coefficients further configured to reduce the magnitude of the displacement component of the controller displacement associated with the detected input signals when the duration of the detected input signals is below a threshold;
computing damped displacement components corresponding to the detected input signals by multiplying a value of one of the spatial damping factors derived according to the polynomial curve that reflects the non-linear relationship that depends on the magnitude of the normalized detected input signals and the predetermined exponent by a value of one of the temporal damping coefficients that is based on the time duration of the detected input signals; and
displaying movement of the cursor in the user interface in accordance with the damped displacement components corresponding to the detected input signals at a corresponding position and with a corresponding velocity in the user interface; and
when manipulation of the cursor is concluded, initiating an attraction sequence to move the cursor to a target element displayed in the user interface.

2. A method as described in claim 1, wherein the computing device comprises a game console and the application comprises a browser implemented by the game console.

3. A method as described in claim 1, wherein the controller includes a directional control device and the input signals are provided by operation of the directional control device.

4. A method as described in claim 1, wherein the attraction sequence comprises ascertaining the target element based on distances between a position of the cursor and position of elements of the user interface with an area of interest established based on the position of the cursor.

5. A method as described in claim 4, wherein the attraction sequence further comprises dispatching commands to reposition the cursor to the target element that is ascertained.

6. A method as described in claim 4, wherein ascertaining the target element comprises:
recognizing elements within the area of interest;
determining bounding boxes for the elements that are recognized;
computing distances between the bounding boxes for the elements and the position of the cursor; and
selecting one of the elements that has a bounding box nearest to the cursor as the target element.

7. A method as described in claim 6, wherein the attraction sequence further comprises posting coordinates of the bounding box for the selected target element for use when cursor attraction is subsequently triggered.

8. A method as described in claim 6, wherein the attraction sequence further comprises applying an offset to the bounding box for the selected target element to ensure that attraction focuses the cursor on an active portion of the target element.

9. A method as described in claim 1, further comprising selecting the target element in dependence upon proximity of the cursor to the elements in the user interface when manipulation of the cursor is concluded.

10. A method as described in claim 1, further comprising disabling the attraction sequence to prevent attraction back to the target element responsive to determining that the cursor was previously attracted to the target element.

11. A method as described in claim 1, further comprising detecting when the manipulation of the cursor is concluded by:
maintaining a tick count indicative of a cursor move event; and
ascertaining that the manipulation of the cursor is concluded when updates to the tick count stop for a designated amount of time.

12. A computing device comprising:
a processing system; and
memory configured to maintain one or more instructions, the one or more instructions executable by the processing system to cause operations including:
detecting input signals from a controller in communication with the computing device to manipulate a cursor in a user interface of the computing device, the detected input signals representing a controller displacement of the controller from a starting position, the controller displacement having displacement components representative of a magnitude and a direction of the controller displacement;
responsive to the detecting, normalizing the detected input signals, and generating:
spatial damping factors according to a polynomial curve that reflects a nonlinear relationship between a displacement component of the controller displacement and a spatially damped displacement component of the controller displacement, the spatial damping factors depending on the magnitude of the normalized detected input signals and a predetermined exponent, the spatial damping factors configured to reduce the magnitude of the displacement component of the controller displacement associated with the detected input signals; and
temporal damping coefficients configured to vary based on a time duration of the detected input signals associated with the controller displacement to produce a ramp-up of cursor velocity over a period of time, the temporal damping coefficients further configured to reduce the magnitude of the displacement component of the controller displacement associated with the detected input signals when the duration of the detected input signals is below a threshold;
computing damped displacement components corresponding to the detected input signals by multiplying a value of one of the spatial damping factors generated according to the polynomial curve that reflects the non-linear relationship that depends on the magnitude of the normalized detected input signals and the predetermined exponent by a value of one of the temporal damping coefficients that is based on the time duration of the detected input signals; and dispatching commands to cause rendering of the cursor in the user interface in accordance with the damped displacement components corresponding to the detected input signals at a corresponding position and with a corresponding velocity in the user interface.

13. A computing device as described in claim 12, wherein the polynomial curve used to generate the spatial damping factors is selectable from a plurality of polynomial curves supported by the computing device to control cursor response.

14. A computing device as described in claim 12, wherein the instructions are executable by the processing system to cause further operations including:

identifying a target element by computing and comparing distances between a position of the cursor and bounding boxes for elements contained in the user interface;

monitoring cursor move events to detect when manipulation of the cursor from the controller concludes; and responsive to conclusion of the manipulation of the cursor, dispatching commands to cause automatic repositioning of the cursor to focus on the target element that is identified.

15. One or more computer-readable hardware storage media comprising instructions stored thereon that, responsive to execution by a computing device, cause the computing device to perform operations comprising:

detecting input signals provided via a controller for the computing device to manipulate a cursor within a user interface for an application, the detected input signals representing a controller displacement of the controller from a starting position, the controller displacement having displacement components representative of a magnitude and a direction of the controller displacement;

responsive to the detecting, normalizing the detected input signals, and generating:

spatial damping factors according to a polynomial curve that reflects a nonlinear relationship between a displacement component of the controller displacement and a spatially damped displacement component of the controller displacement, the spatial damping factors depending on the magnitude of the normalized detected input signals and a predetermined exponent, the spatial damping factors configured to reduce the magnitude of the displacement component of the controller displacement; and temporal damping coefficients configured to vary based on a time duration of the detected input signals associated with the control displacement to produce a ramp-up of cursor velocity over a period of time, the temporal damping coefficients further configured to reduce the magnitude of the displacement component of the controller displacement associated with the detected input signals when the duration of the detected input signals is below a threshold;

computing damped displacement components corresponding to the detected input signals by multiplying a value of one of the spatial damping factors generated according to the polynomial curve that reflects the non-linear relationship that depends on the magnitude of the normalized detected input signals and the predetermined exponent by a value of one of the temporal damping coefficients that is based on the time duration of the detected input signals; and generating commands to cause rendering of the cursor in the user interface in accordance with the damped displacement components corresponding to the detected input signals at a corresponding position and with a corresponding velocity in the user interface.

16. One or more computer-readable hardware storage media as described in claim 15, wherein the application comprises a browser implemented by the computing device.

17. One or more computer-readable hardware storage media as described in claim 15, the operations further comprising initiating an attraction sequence to move the cursor to a target element displayed in the user interface.

18. One or more computer-readable hardware storage media as described in claim 17, the operations further comprising:

recognizing elements within the user interface in proximity to the cursor;

determining bounding boxes for the elements that are recognized;

computing distances between the bounding boxes for the elements and the position of the cursor;

electing an element based on a bounding box that is closest to the position of the cursor as the target element.

19. One or more computer-readable hardware storage media as described in claim 18, the operations further comprising:

enabling attraction back to the target element based on a determination that an overshoot of the target element has occurred; and dispatching commands to automatically reposition the cursor to a position associated with the target element without further input being provided to cause the repositioning.

20. One or more computer-readable hardware storage media as described in claim 18, the operations further comprising disabling attraction back to the target element based on a determination that the detected input signals began with the cursor located at the target element, the determination based on the cursor having zero velocity at the target element before the input signals are detected.

* * * * *